Patented Feb. 9, 1954

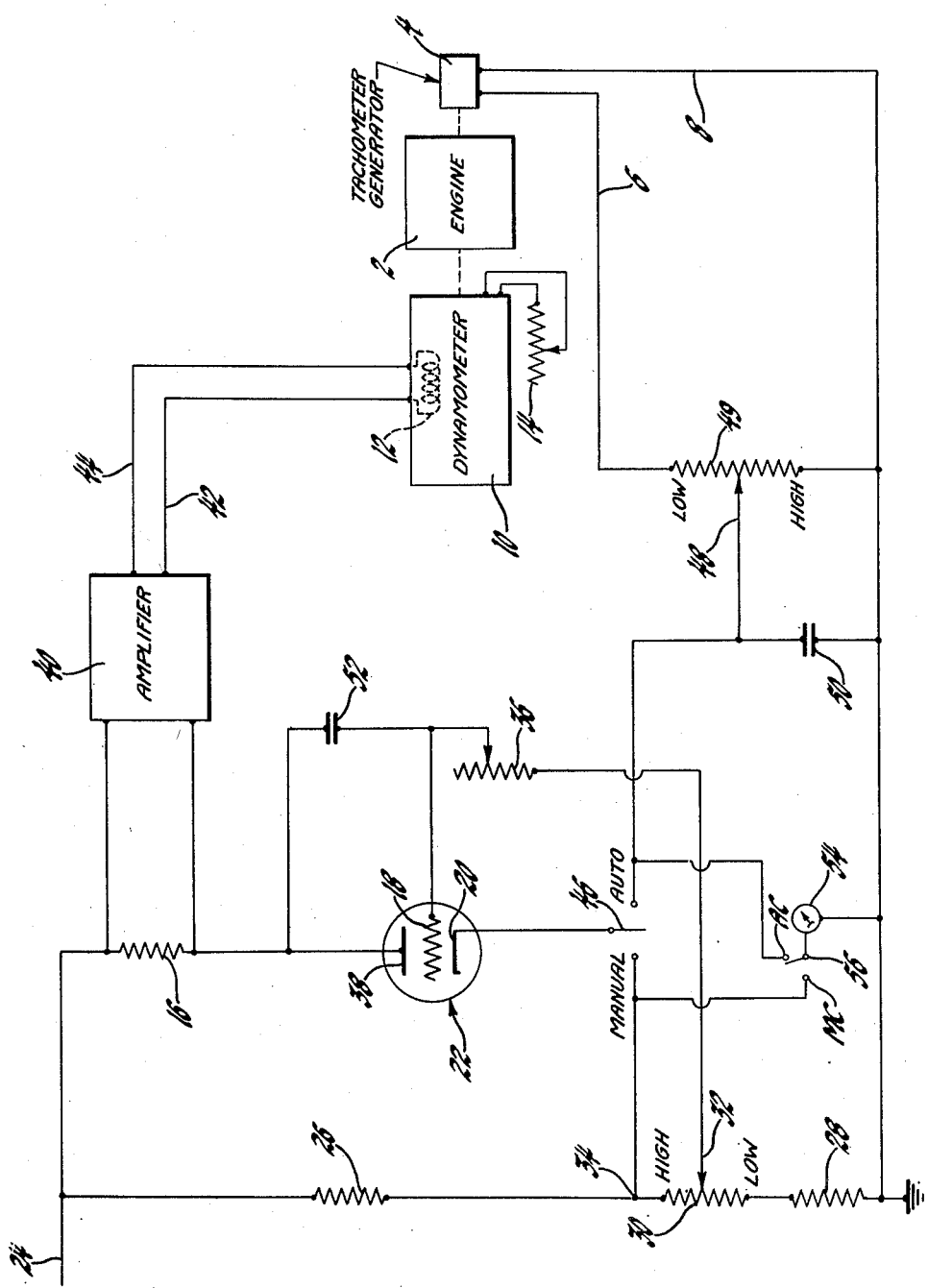

2,668,921

UNITED STATES PATENT OFFICE 2,668,921

ANTIHUNTING SYSTEM FOR CONSTANT SPEED ENGINES

Joseph F. Lash, Ferndale, Mich., assignor to General Motors Corporation, Detroit, Mich., a corporation of Delaware Application September 3, 1949, Serial No. 114,053

6 Claims. (Cl. 310—93)

The present invention relates to means for controlling engine load so as to maintain engine speed constant. More particularly it relates to means for controlling the field current in a dynamometer so as to maintain the speed of the engine driving the dynamometer substantially constant regardless of other loads placed on said engine.

Various means have been provided in the prior art for controlling the speed of the prime mover so as to maintain this speed constant under varying load conditions. Various means have also been provided for controlling the load imposed on a prime mover by a dynamometer so as to maintain the speed of the prime mover constant. These prior devices are either quite complicated, lack the necessary sensitivity of control or are subject to hunting under varying load conditions.

It is quite desirable that a simple inexpensive control be provided for maintaining the speed of the prime mover constant when said prime mover is connected to a generator such as a dynamometer. It is also quite desirable that this control be either automatic or manual with means for changing the control without excessive engine acceleration or deceleration and that means be provided for preventing engine hunt while in either manual or automatic control.

It is therefore an object of the present invention to provide a simple compact apparatus for controlling the speed of a prime mover.

It is a further object of the present invention to provide a simple electronic means capable of either manually or automatically controlling the speed of an engine and containing means for preventing hunting of the engine.

Other objects of this invention will become apparent upon reading the specification and inspection of the drawing and will be particularly pointed out in the claims.

Referring to the figure of the drawing, 2 is a prime mover of the internal combustion engine type. This engine may be either of the gasoline or diesel type or in fact any other type such as a steam or gas turbine. 2 is connected to a tachometer generator 4 which produces a D. C. voltage across the conductors 6 and 8 whose magnitude is a direct function of engine speed. Also rigidly coupled to the engine is a dynamometer 10 having a separately excitable field coil 12. The dynamometer or generator 10 works into a load circuit 14 and the magnitude of the energy furnished the load circuit is a function of the current in the separately excited field coil 12. This load circuit 14 may be a resistor as shown in the drawing or may consist of electric motors or other conventional load. The energization of the winding 12 and hence the load exerted on the engine 2 by the dynamometer or generator 10 is a function of the voltage across the resistance 16 and hence depends on the voltage impressed between the grid 18 and the cathode 20 of the tube 22. When operating on manual, the system is not responsive to engine speed. To provide the necessary voltages, a D. C. power supply 24 of conventional design is provided. This D. C. voltage is impressed across a voltage divider circuit including fixed resistors 26 and 28 and variable resistor 30. The variable resistor 30 has a movable tap 32 which may be adjusted for manual control. Under these conditions of operation the voltage at the point 34 is impressed upon the cathode 20 and the voltage at the center tap 32 is impressed upon the grid 18 through variable resistor 36. Under these conditions of operation, the negative grid bias on the grid 18 is dependent only on the voltage difference between the points 32 and 34. This grid bias determines the amount of current passed from the plate 38 to the cathode 20 of the tube 22. This current builds up a voltage across the resistor 16 which voltage controls the power amplifier 40 and hence controls the amount of current transmitted from that amplifier to the conductors 42 and 44 to the separately excited field coil 12 of the generator 10. The higher the voltage across the resistor 16, the higher the bias on the power amplifier 40 and the less current produced in the coil 12. Therefore the closer the potential at the tap 32 comes to that at the point 34, the less load will be placed on the generator or the prime mover and the faster the prime mover will run.

It is many times desirable to control the load on the prime mover responsive to the speed of this prime mover and thus maintain this speed at a predetermined value. When these conditions of operation are desired, the switch 46 is placed on "auto" thus causing the voltage on the cathode 20 to be responsive to the voltage at the tap 48 of the resistor 49. The voltage across the resistor 49 is, as mentioned above, a function of the speed of the tachometer generator 4 and therefore the voltage at the point 48 is a function of this speed plus a function of the position of the tap on the resistor 49. Most tachometer generators produce a D. C. signal which has alternating current components superimposed thereon caused by the commutator contacts. The condenser 50 removes these alternating current components. Under these conditions of operation it may be seen that the grid cathode potential between grid 18 and cathode 20 is a function of the position of the tap 32, the position of the tap 48 and the speed of the engine 2. If these two taps are allowed to remain in a fixed position, the grid bias becomes a function of speed and thus the plate current is also a function of speed. Therefore the voltage across the resistor 16 is an inverse function of engine speed and the current through the field coil 12 is a function of engine speed. Thus as the engine speeds up, the negative potential between grid 18 and cathode 20 increases thereby decreasing the plate current and the resulting voltage across the resistor 16. This decreases the bias on the amplifier 40 and increases the current through the coil 12 thereby increasing the load impressed on the prime mover by the generator 10. This slows the engine up bringing it back toward the predetermined operating speed. Under rapidly fluctuating conditions, the control units in the prior art tend to overcontrol, causing hunting. To prevent this hunting, I have provided an electrical time constant circuit including variable resistor 36 and condenser 52. The time constant of this circuit may be varied by varying the position of the tap on the resistor 36. By inspection of the drawing, it will be noted that the condenser 52 is charged and discharged responsive to the voltage between the grid 18 and plate 38 of the tube 22. Under operating conditions the impedance of the tube may be varied rapidly by varying the grid potential. Unless prevented by an auxiliary circuit, the current through the tube would vary rapidly thus giving rapid pulses of current through the resistor 16. By use of condenser 52 and variable resistor 36, the rapid variations of current through resistor 16 are damped in a manner explained as follows. The current that charges (or discharges) condenser 52 must flow through variable resistor 36. Grid 18 cannot conduct appreciable current, which is the case in any vacuum tube circuit where the grid is maintained negative with respect to the cathode. This charging (or discharging) current flowing through resistor 36 will change the potential between grid 18 and cathode 20 in a direction that always opposes the change in voltage developed at tap 48 by the tachometer generator. When the movable tap on 36 is adjusted for less resistance, the opposing voltage will be smaller, causing less damping and vice versa. This circuit provides an additional desirable feature in that the time constant for condenser 52 and resistor 36 is multiplied by the amplification factor of tube 22, thus reducing considerably the capacity required in condenser 52 for proper damping.

In order to provide means for shifting from manual to automatic and vice versa without excessive acceleration or deceleration of the engine, I have provided an auxiliary circuit including a meter 54 and a switch 56. The switch 56 may be switched to MC to measure the manual control voltage at the point 34 and may be switched to AC to measure automatic control voltage at the point 48. When it is desired to shift from manual to automatic control or vice versa, the tap 48 may be adjusted so that the meter 54 reads the same voltage whether the switch 56 is on MC or AC.

It is to be understood also that although the invention has been described with specific reference to a particular embodiment thereof, it is not to be so limited, since changes and alterations therein may be made which are within the full intended scope of this invention as defined by the appended claims.

I claim:

1. In a speed control system for a prime mover having a controllable load, an auxiliary generator providing a control voltage proportional to speed, a multi-element thermionic tube having input and output circuits and a control grid, with connections between the output circuit and the controllable load and between the input circuit and the output of the auxiliary generator, the combination with said thermionic tube of a source of biasing potential and a time constant circuit interconnecting said tube output with said control grid and the source of biasing potential to apply changes in output potential to the control grid for damping rapid changes in output current.

2. In a speed control system for a prime mover having a controllable load, an auxiliary generator providing a control voltage proportional to speed, a thermionic tube having a plate, grid and cathode, said plate being connected to the controllable load and said cathode to the output of the auxiliary generator, the combination with said thermionic tube of biasing means connected to the grid and a time constant circuit interconnecting said plate, grid and biasing source to apply changes in plate potential to the grid for damping rapid changes in plate current.

3. In a speed control system for a prime mover having a controllable load, an auxiliary generator providing a control voltage proportional to speed, a thermionic tube having a plate, grid and cathode, said plate being connected to the controllable load and cathode to the output of the auxiliary generator, the combination with said thermionic tube of a condenser connected between the plate and the grid, a source of biasing potential, a variable resistance connected between the grid and said biasing potential, said condenser and resistance forming a time constant system to apply changes in the plate potential to the grid to damp rapid changes in plate current.

4. In a speed control system for a prime mover having a controllable load, an auxiliary generator providing a control voltage proportional to speed, a thermionic tube having a plate, grid and cathode, said plate being connected to the controllable load and said cathode to the output of the auxiliary generator, the combination with said thermionic tube of a condenser connected between the plate and the grid, a source of biasing potential, a variable resistance connected between the grid and said biasing potential, said condenser and resistance forming a time constant system to apply changes in the plate potential to the grid to damp rapid changes in plate current, said condenser being of relatively small value, since it receives the amplifying effect of the tube.

5. In a speed control system for a prime mover having a controllable load, an auxiliary generator providing a control voltage proportional to speed, a thermionic tube having a plate, grid and cathode, said plate being connected to the controllable load, a source of potential, the combination with said thermionic tube of switching means for alternately connecting said cathode to the source of potential or to the output of the auxiliary generator and a time constant circuit interconnecting said plate, grid and source of potential to apply changes in plate potential to the grid for damping rapid changes, said switching means providing either a set control or one varying with load.

6. In a speed control system for a prime mover having a controllable load, an auxiliary generator providing a control voltage proportional to speed, a thermionic tube having a plate, grid and cathode, said plate being connected to the controllable load, a source of potential, the combination with said thermionic tube of switching means for alternately connecting said cathode to the source of potential or to the output of the auxiliary generator and a time constant circuit interconnecting said plate, grid and source of potential to apply changes in plate potential to the grid for damping rapid changes, said switching means providing either a set control or one varying with load, and indicating means connectable across the potential source or across the output of the auxiliary generator to indicate the voltage thereon for switching purposes.

JOSEPH F. LASH.

References Cited in the file of this patent

UNITED STATES PATENTS

| Number | Name | Date |
|---|---|---|
| 1,423,518 | Espenchied | July 25, 1922 |
| 2,298,894 | McDougal | Oct. 13, 1942 |
| 2,300,960 | Porter | Nov. 3, 1942 |
| 2,381,250 | Baumann | Aug. 7, 1945 |
| 2,472,396 | Schoenbaum | June 7, 1949 |

FOREIGN PATENTS

| Number | Country | Date |
|---|---|---|
| 330,362 | Great Britain | June 12, 1930 |